Jan. 19, 1954  J. P. GUELPA  2,666,883
METHOD OF AND APPARATUS FOR AUTOMATICALLY
CHARGING ACCUMULATOR BATTERIES
Filed Sept. 6, 1950  2 Sheets-Sheet 1

INVENTOR
JEAN PIERRE GUELPA
BY Adams & Bush
ATTORNEYS

UNITED STATES PATENT OFFICE 2,666,883

METHOD OF AND APPARATUS FOR AUTOMATICALLY CHARGING ACCUMULATOR BATTERIES

Jean Pierre Guelpa, Colombes, France, assignor to Compagnie Generale d'Electricite, Paris, France, a corporation of France Application September 6, 1950, Serial No. 183,338

8 Claims. (Cl. 320—23)

This invention relates to a new method of and apparatus for the automatic recharging of accumulators.

Generally speaking, there is only a short time available for recharging accumulators. If the charging current could be maintained at one value through the charging period, the required power of the charging source could easily be determined. In practice, the current must be reduced as soon as the battery commences to evolve gas, and having regard to available time, this necessitates an increase in the initial working rate.

The most rational charging system is therefore that which comprises a first constant-current stage employing the full maximum power of the charging station, followed, immediately the evolution of gas commences, by a progressive reduction of the charging current.

Various systems have been proposed along these lines. In one such system, it was suggested that the actual evolution of the gas should control the charging source. It has also been proposed to employ either the increase in the voltage charge in the battery or the state of charge of the battery, as measured by an ampere-hour meter.

Apart from the fact that certain defects arise in the practical application of these two methods, they presuppose that the evolution of gas takes place at a certain voltage or at a certain state of charge of the battery, which is only correct as a first approximation. The influence of temperature, of the strength of the charging current and of the ageing of the battery modify the phenomena and cause in certain cases either overcharging prejudicial to the good preservation of the battery components or incomplete charging in the time available.

According to the present invention there is provided a method of automatically charging an accumulator battery in two stages, the first stage being at constant current and the second stage at variable current, the first stage comprising the step of charging the battery from a constant current charging source until the temperature difference T between the interior of the battery and the ambient air is more than the temperature difference Te which is set up when the fully-charged battery is overcharged at the final rate of charging, and said second stage comprising the steps of reducing the charging current until the temperature difference T does not exceed Te and maintaining this temperature difference until the battery is fully charged.

Calculation and experiment show that for generally acceptable initial currents of the order of 0.20 I (I being the capacity in ampere-hours of a battery discharged in five hours) and as long as no gassing occurs the temperature increase is extremely small. For a battery of normal construction (starting or traction) which is completely heat-insulated, it is of the order of 1° C. per hour. However, as soon as gassing commences, the internal resistance increases and the electrolysis of the water brings about an additional evolution of heat. At the end of the charging operation, the equivalent in energy of the difference between the theoretical and true voltages of the electrolysis of the water (1.1 v. and 2.6 v. approximately) completely takes the form of heat, the evolution of which is then much greater. The same current of 0.20 I would produce an hourly temperature increase about ten times higher with a heat-insulated battery assumed to be completely charged.

In fact, batteries are not heat-insulated and radiate differing quantities of heat according to their construction and their difference in temperature from the ambient air. However, the ratio between the two temperature increases tends to be proportional to the internal evolution of heat. Thus, in the preceding example, the ratio will still be ten times higher in the second case than in the first.

The current which, when applied to a completely charged battery produces an evolution of heat equal to that in the first case is about 0.035 I. It is to be remarked that this figure is that which is given by most authors for the equalisation current considered to be non-injurious to batteries.

The charging method defined will therefore be as follows:

When the accepted final rate of charge has been fixed, the temperature difference Te which is finally set up in practice at this rate between the fully charged battery and the ambient air is measured. This value Te is adopted as a criterion for the adjustment of the charge. As long as the temperature difference T from the ambient air does not reach Te, the charge is allowed to remain at the maximum value permitted by the charging source. However, as soon as T exceeds Te, the rate of charge will be reduced until T is again lower than or equal to Te.

It will therefore be seen that with a slight delay due to the thermal inertia of the battery, the charge will be reduced as soon as the evolution of gas commences. Then, with a few oscillations also due to thermal inertia, this reduction will continue progressively until the battery is fully charged.

The consequences of this thermal inertia of the battery can be shown with reference to the preceding example, where the final charging rate is 0.035 I, and the initial rate is 0.20 I. It has been observed that the evolution of heat at the commencement and at the end of the charging are equivalent. Consequently, untimely operation of the regulator might occur during the first period. In practice, in order to avoid this disadvantage, it is necessary to choose either a slightly lower initial rate (0.17 I for example) or a higher final rate (0.05 I for example, with a correspondingly higher T$e$).

It is thus apparent that it is expedient to proportion the initial rate permitted by the charging station and the final rate allowed for by the construction of the battery.

The problem of the rapid emergency charging of a motor-car starting battery may be solved as follows:

Initial current $I^1$ ($I^1$ capacity in ampere-hours of the battery discharged in 10 hours).

Final current 0.20 $I^1$, the latter being admissible in this particular case because this charge is exceptional and its duration is less than one hour.

The method of the invention is extremely safe. If one or more damaged elements cause an abnormal temperature increase in the first stage of the charging the current will be reduced, thus protecting the battery, and the incomplete charge resulting therefrom will act as a warning of a fault in the battery. Similarly, if a battery is sulphated, the increase in internal resistance will automatically bring about the charging at the low rate which is recommended in this case.

The invention is also concerned with a device for the automatic performance of the method hereinbefore described and accordingly there is provided apparatus for charging an accumulator battery having a first casing part in contact with the interior of the accumulator battery, a second casing part in thermometric contact with the ambient air and means electrically responsive to a predetermined temperature difference between the two parts, a circuit including a charging source and the accumulator battery, means for modifying said circuit to reduce the charging current therein, and connections between said electrically responsive means and said means for modifying said circuit whereby the charging current is reduced when said predetermined temperature difference is exceeded.

Such a thermometric control may be contained in an elongated casing secured in the centre part in place of the plug of an accumulator battery.

The lower part of the casing constitutes a chamber subjected to the temperature of the battery, while the upper part of the same casing forms a second chamber maintained at the temperature of the ambient atmosphere.

A regulating device of this particular type will hereinafter be referred to as a "plug." If the device is mounted entirely outside the battery, the temperature of the latter may be communicated to an enclosed chamber by the electric connections of the battery, which because of the high conductivity of the metals, may be regarded as being at a similar temperature to that of the interior of the battery.

The thermometric device may also be employed in conjunction with any other automatic or non-automatic charging system which may be provided for an accumulator battery.

The protection of a battery by an ordinary thermostat is, in fact, illusory. If the thermostat is regulated to a certain value (for example 20° C.) above the mean surrounding temperature, and if the external temperature rises considerably, the thermostat will operate unnecessarily, without any overload occurring, and will prevent the normal charging from taking place. In order to avoid this, the thermostat must be set for example at 20° C. above the highest ambient temperature to which the battery can be subjected.

In cold weather this operating temperature of the thermostat will never be reached, regardless of the overload to which the battery is subjected. However a large overload, even at a low temperature, is always harmful, causing disintegration of the active substances, whilst the temperature increase aggravates the phenomenon.

In consequence, an ordinary thermostat only gives a restricted protection against a large overload, i. e. when there is a high ambient temperature.

On the other hand, a thermometric device, operating in direct relation to the external temperature gives complete safety, as it can be set for a point only slightly above the ambient temperature, and will operate as soon as a noticeable overload begins to cause heating of the battery.

For a better understanding of the invention, two examples of methods and apparatus which may be employed, are described by way of example with reference to the accompanying drawings, in which, Figure 1 is a section through a plug.

Figure 1:
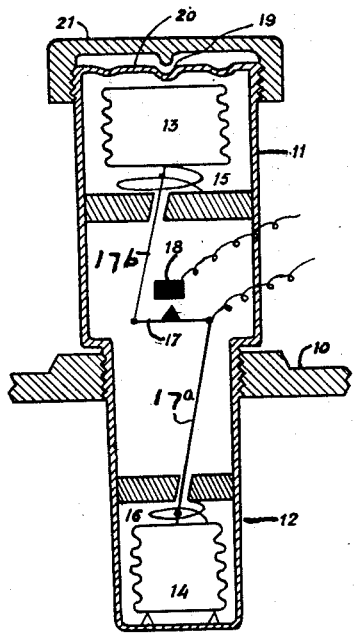

Referring now to Figure 1, the centre part of the plug is screwed in place of the plug of a battery, on the cover 10 of the latter. The plug upper part 11 is surrounded by the ambient atmosphere, whilst the lower part 12 is brought to the internal temperature of the battery. The actual regulator is constituted by two heat-sensitive capsules 13 and 14 disposed at the top and at the bottom of the chambers 11 and 12 respectively and maintained in their housings by light springs 15 and 16. The difference between the displacements of the capsules acts on an electric contact 18 through an articulated lever 17.

The equilibrium temperature for a given rate of operation can vary from one battery to the other according to the manner in which it is arranged, according to the box in which it is contained and according to the ventilating arrangement. It is therefore necessary to be able to adjust the point of operation of the thermometric control. For this purpose, the capsule 13 bears against a displaceable stop 19 on the flexible wall 20 of the apparatus. This wall may itself be deformed by the action of the screw-threaded cap 21, which is tightened to regulate the position of the stop 19.

Figure 2:
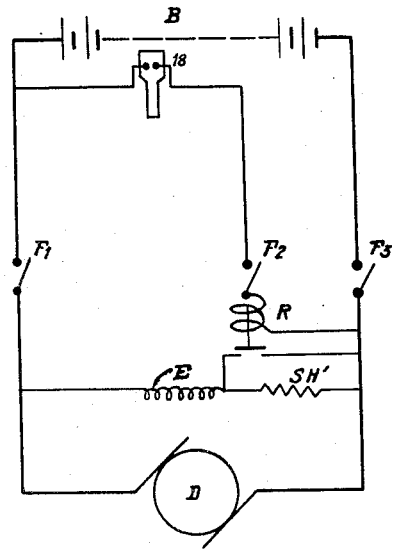
Figure 2 shows diagrammatically a discontinuously regulated charging installation incorporating the plug of Figure 1.

The regulator of the type hereinbefore described may be used for automatically charging an accumulator battery B, with discontinuous regulation, by means of the arrangement shown in Figure 2. The battery B is connected by the charging connector ($F_1$, $F_2$, $F_3$) to a two-stage charging dynamo, with excitation E and a resistance $SH^1$ in series with said excitation E.

This resistance may be short-circuited by the relay R, which is in turn controlled by the contactor 18 of the thermometric control.

Figure 5:
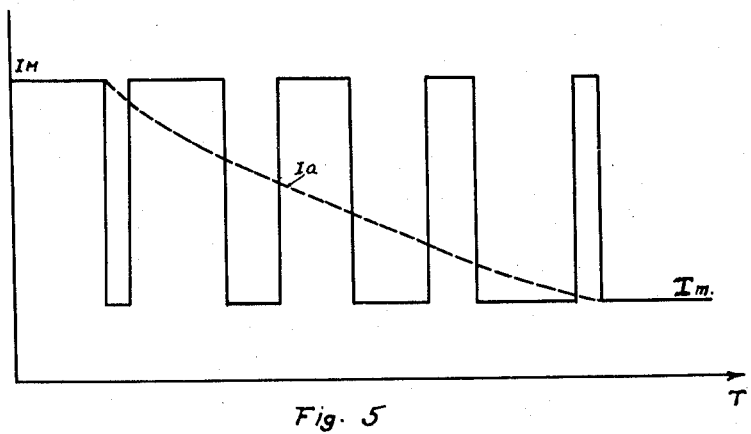
Figure 5 shows the charging curve of a discontinuously regulated battery.

Under these conditions, the charging of the battery B will be effected with discontinuous regulation such as is exemplified by the graph in Figure 5. The charging source only has two fixed rates of operation, one high at a charging current $I_M$, corresponding to the maximum power, and one low corresponding to the final charging current $I_m$. As long as no evolution of gas occurs, the current will remain constant and have the value $I_M$. At the end of the charging, the current will be also constant and equal to the final charging value $I_m$. However, during the intermediate period, a succession of high and low rates will occur, the high charging period becoming progressively shorter, whilst the low charging periods become progressively longer, in accordance with the successive openings and closings of the contactor 18 of plug 11—12. The mean current $Ia$ resulting therefrom, will progressively decrease as shown by the chain curve.

Figure 3:
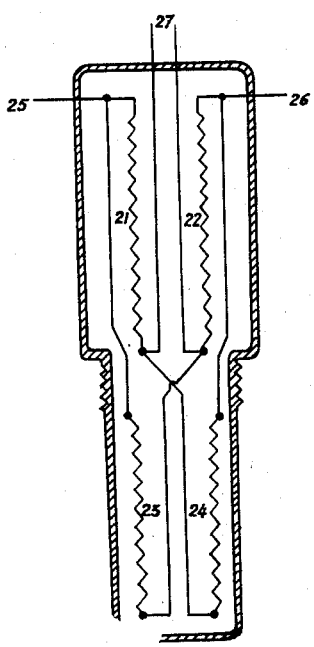
Figure 3 is a section through another type of plug.

Figure 3 shows another form of construction of the temperature responsive plug, wherein there is an assembly of four resistances 21, 22, 23, 24 connected in the form of a Wheatstone bridge. The two opposite resistances 23 and 24 are arranged in the lower part of the plug and are subjected to the internal temperature of the battery, while the other two resistances 21 and 22 are in the upper part and are subjected to the ambient temperature. Since the bridge is fed at 25, 26 from a suitable source, the current set up in the central branch 27 will be proportional to the temperature difference and may be used after amplification to effect the continuous regulation of the charging source.

Figure 4:
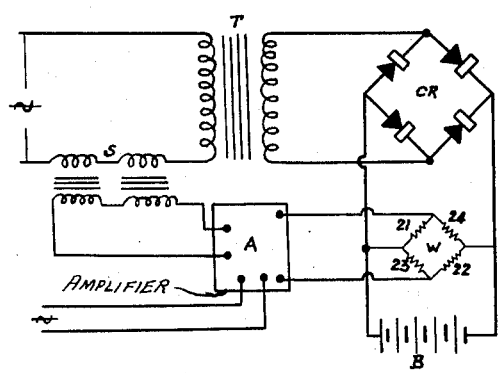
Figure 4 shows diagrammatically a continuously regulated charging installation incorporating the plug according to Figure 3.

A corresponding arrangement for automatically charging a battery B is shown in Figure 4. The charging source is in this case connected to an alternating current supply with a feed transformer T and an assembly of rectifier cells C R, with continuous adjustment by means of a saturated inductance S. The continuous saturation current is produced by an amplifier A of any type fed with alternating current, for example, and controlled by the bridge W of the resistances of the plug of Figure 3.

Figure 6:
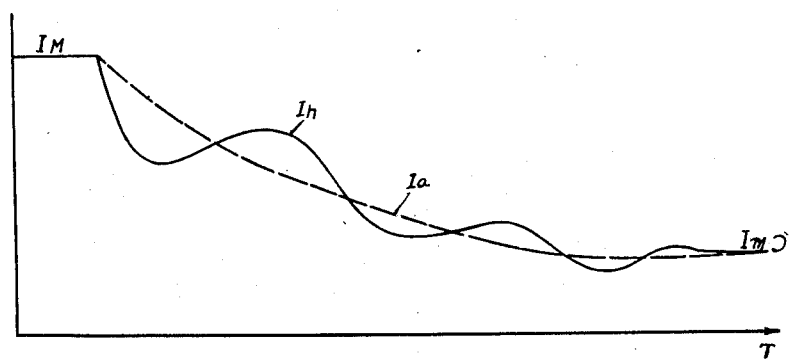
Figure 6 shows the charging curve of a continuously regulated battery.

In the case of a charging source of this type, owing to the thermal inertia of the battery and the inertia of the control system, the current strength during the period of transition or second charging stage will comprise damped oscillations around the mean current $Ia$, as represented by the graph of Figure 6.

I claim:

1. A method of automatically charging an accumulator battery in two stages, the first stage being at constant current and the second stage at variable current, the first stage comprising the step of charging the battery from a constant current charging source until the temperature difference T between the interior of the battery and the ambient air is more than the temperature difference Te which is set up when the fully-charged battery is overcharged at the final rate of charging, and said second stage comprising the steps of reducing the charging current until the temperature difference T does not exceed Te and maintaining this temperature difference until the battery is fully charged.

2. A method as claimed in claim 1, wherein the temperature difference T does not stand higher than Te during the second charging stage, by discontinuous variation of the charging current, there being a series of charging periods at the rate of charging of the first charging stage alternating with a series of charging periods at the final rate of charging.

3. A method as claimed in claim 1, wherein the temperature difference T does not stand higher than Te during the second charging stage by a continuous variation of the charging current, there being damped oscillations on either side of a curve of decreasing mean values.

4. Apparatus for charging an accumulator battery having a first casing part in contact with the interior of the accumulator battery, a second casing part in thermometric contact with the ambient air and means electrically responsive to a predetermined temperature difference between the two parts, a circuit including a charging source and the accumulator battery, means for modifying said circuit to reduce the charging current therein, and connections between said electrically responsive means and said means for modifying said circuit whereby the charging current is reduced when said predetermined temperature difference is exceeded.

5. In apparatus for the automatic charging of storage batteries, a source of charging current, output variation means for controlling the output current of said source, a thermo-responsive device responsive to the difference between the temperature of the interior of a battery and the ambient atmosphere, actuating means connected between said thermo-responsive device and said output variation means whereby said thermo-responsive means causes actuation of said output variation means, said device and said means being so arranged that the output charging current of said source is reduced when the said temperature difference to which said thermo-responsive device is responsive, exceeds a determined critical value.

6. Apparatus according to claim 5, said thermo-responsive device being a hollow elongated plug adapted to be partially inserted in a battery, a first temperature expansible capsule located within said plug near the end thereof outside the battery, a second temperature expansible capsule located within said plug near the end thereof inside the battery, an electric switch within said plug, and mechanical control means connected mechanically between said capsules and adapted to actuate said switch, said actuating means being connected between the contacts of said switch and said output variation means.

7. Apparatus according to claim 5, said source being a generator having a field winding and an auxiliary winding in series with said field winding, said output variation means being an electromagnetic circuit breaker having its contacts connected to shunt said auxiliary winding, said thermo-responsive device being a hollow elongated plug adapted to be inserted in a battery, a first temperature expansible capsule located within said plug near the end thereof outside the battery, a second temperature expansible capsule located within said plug near the end thereof inside the battery, an electric switch within said plug, mechanical control means connected mechanically between said capsules and adapted to actuate said switch, said actuating means being connected between the contacts of said switch and the actuating winding of said electromagnetic circuit breaker.

8. Apparatus according to claim 5, said thermo-responsive device being a hollow elongated plug adapted to be partially inserted in a battery, a first pair of resistance elements whose resistance varies with temperature located within said plug near the end thereof outside the battery, a second pair of resistance elements whose resistance varies with temperature located within said plug near the end thereof inside the battery, said resistance elements being connected as a bridge with the elements of a said pair forming opposite arms of said bridge, the opposite supply corners of said bridge being connected to said source, and said actuating means being a connection to said output variation means from the other two opposite output corners of said bridge.

JEAN PIERRE GUELPA.

References Cited in the file of this patent

UNITED STATES PATENTS

| Number | Name | Date |
|---|---|---|
| Re. 22,883 | Heyer | May 27, 1947 |
| 1,457,863 | Strawmyer et al. | June 5, 1923 |
| 1,602,559 | Strawmyer | Oct. 12, 1926 |
| 1,983,243 | Rose et al. | Dec. 4, 1934 |
| 2,022,874 | West | Dec. 3, 1935 |
| 2,067,959 | Wasson | Jan. 19, 1937 |
| 2,069,054 | Adams | Jan. 26, 1937 |
| 2,102,141 | Wagar | Dec. 14, 1937 |
| 2,197,230 | Waddell | Apr. 16, 1940 |
| 2,307,626 | Kelly | Jan 5, 1943 |
| 2,431,945 | Little et al. | Dec. 2, 1947 |
| 2,498,814 | Little et al. | Feb. 28, 1950 |
| 2,514,881 | Leupold | July 11, 1950 |
| 2,526,251 | Medlar | Oct. 17, 1950 |
| 2,585,005 | Godshalk et al. | Feb. 12, 1952 |

FOREIGN PATENTS

| Number | Country | Date |
|---|---|---|
| 318,699 | Great Britain | Sept. 12, 1929 |
| 343,017 | Great Britain | Jan. 28, 1931 |
| 474,398 | Great Britain | Nov. 1, 1937 |
| 832,151 | France | June 27, 1938 |